US006856968B2

(12) United States Patent
Cooley et al.

(10) Patent No.: US 6,856,968 B2
(45) Date of Patent: Feb. 15, 2005

(54) INTERACTIVE SEARCH PROCESS FOR PRODUCT INQUIRIES

(75) Inventors: Walter Hening Cooley, Pacific Grove, CA (US); Gary James Traina, San Jose, CA (US); Julie Suzanne Wells, San Jose, CA (US); George David Cagley, II, San Jose, CA (US); Manjeet Kaur Khinda, Salinas, CA (US); Charlene Eclavea Villagomez Roger, Milpitas, CA (US); Fred Masato Ikemoto, San Jose, CA (US); Wayne Allen Stotts, Monroeville, NJ (US); Stephen Arthur Swain, Gilroy, CA (US); Craig Wesley Tetirick, San Jose, CA (US); Colin Terry Phillips, Fremont, CA (US); Donna Marie Cox, Stockton, CA (US); Leslie Jean Ose, San Jose, CA (US); Craig Ernest Leighty, Pleasanton, CA (US); Thomas S. Panetta, Phoenixville, PA (US); Craig Scott Goldberg, Los Gatos, CA (US); Carolyn Elizabeth Wong, San Jose, CA (US); Robert Merle Schuster, San Jose, CA (US); Richard Lance Cory, San Jose, CA (US); James Michael Duley, Sr., San Jose, CA (US); James Stephens Gay, Morgan Hill, CA (US); Ronald Scott Dahlin, San Carlos, CA (US); Carolyn R. Shockley, San Jose, CA (US)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 09/748,010

(22) Filed: Dec. 27, 2000

(65) Prior Publication Data

US 2002/0082958 A1 Jun. 27, 2002

(51) Int. Cl.[7] .............................................. G06F 17/60

(52) U.S. Cl. ............................................. 705/28; 707/3
(58) Field of Search .............................. 705/26, 28, 27, 705/29, 37; 707/3, 4, 5

(56) References Cited

U.S. PATENT DOCUMENTS 4,992,940 A * 2/1991 Dworkin ....................... 705/26
5,432,904 A * 7/1995 Wong ............................ 705/4

(List continued on next page.)

FOREIGN PATENT DOCUMENTS

WO  WO 97/44749  * 11/1997

OTHER PUBLICATIONS

Derfler, Frank J. et. al. How Networks Work, Millennium Ed., Que Corporation, Jan. 2000.*
White, Ron, How Computers Work Millennium Ed. Que Corporation, Sep. 1999.*
Gralla, Preston, How the Internet Works, Millennium Ed., Que Corporation, Aug. 1999.*
Blue Chip Inventory Serviess from www.count-it.com, webpage, Jan. 19, 1998.*

Primary Examiner—Robert P. Olszewski
Assistant Examiner—Andrew J. Fischer
(74) Attorney, Agent, or Firm—Nixon & Vanderhye P.C.

(57) ABSTRACT

A business process utilizes computer software and electronic customer/supplier connections to supply information, receive requests for quotation, supply quotations, receive purchase orders, and perform commercial and technical functions associated with delivery of such purchase orders or quotations with respect to environment and use specific products. Such products require customer or plant application unique technical evaluation and/or commercial processing to ensure applicability to a specific customer application. The system provides a vehicle to search for parts requiring such technical review encompassing anticipated product use.

17 Claims, 13 Drawing Sheets

U.S. PATENT DOCUMENTS

| | | | | |
|---|---|---|---|---|
| 5,571,596 A | * | 11/1996 | Johnson | 428/143 |
| 5,765,143 A | * | 6/1998 | Sheldon et al. | 705/28 |
| 5,796,614 A | * | 8/1998 | Yamada | 700/106 |
| 5,916,530 A | * | 6/1999 | Maus et al. | 422/179 |
| 6,023,683 A | * | 2/2000 | Johnson et al. | 705/26 |
| 6,081,789 A | * | 6/2000 | Purcell | 705/37 |
| 6,240,425 B1 | * | 5/2001 | Naughton | 707/104 |
| 6,247,289 B1 | * | 6/2001 | Karpinia | 52/748.1 |
| 6,272,472 B1 | * | 8/2001 | Danneels | 705/27 |
| 6,311,178 B1 | * | 10/2001 | Be et al. | 707/3 |
| 6,324,522 B2 | * | 11/2001 | Peterson et al. | 705/28 |
| 6,389,337 B1 | * | 5/2002 | Kolls | 701/29 |
| 6,421,675 B1 | * | 7/2002 | Ryan et al. | 707/100 |
| 2001/0034656 A1 | * | 10/2001 | Lucas et al. | 705/26 |

* cited by examiner

*Logo*

| GE Home | Help | FAQs | Feedback | |
|---|---|---|---|---|

GE Nuclear Parts Online

Select Part Number  228B2614G003 - ANALOG MODULE  ▼

*5 Part numbers found, Select part number then click continue . . .*

| Continue . . . |
|---|

FIG. 4

*Logo*

| GE Home | Help | FAQs | Feedback |

GE Nuclear Parts Online

| Part Number | 228B2614G003 | Request Quote | Description |
|---|---|---|---|
| IEEE 323 | 1974 | | ANALOG MODULE |
| IEEE 344 | 1975 | | |
| Safety Class | SAFETY RELATED | | |
| Shelf Life | 40 Year(s) | | |
| ASME | ☐ | | |
| Purchase Option | New/Refurbish/Upgrade ▼ | | Supercession/Replacement |
| Cycle Time | 14 Week(s) | | 239B7507G001 ▼ Find |

*Note:* The above cycle time is an estimate. Actual cycle times may be more or less depending on inventory. Customer unique contractual provisions are not reflected in this data.

GE Contact __JOHN SMITH__

Telephone #(000) 000-0000

Customer Service Number (000) 000-0000

Return [back] and select another Part Number from the list

Legal Notice

THE INFORMATION AVAILABLE ON THIS SITE IS PROVIDED SOLELY FOR THE PURPOSE OF ALLOWING CUSTOMERS OF GE NUCLEAR ENERGY (GENE) TO REQUEST QUOTATIONS FOR IDENTIFIED PARTS FROM GENE AND IS NOT SUITABLE FOR ANY OTHER PURPOSE WHATSOEVER, INCLUDING BUT NOT LIMITED TO DESIGN OF PARTS. THIS INFORMATION IS PROVIDED "AS IS" AND WITHOUT ANY REPRESENTATION OR WARRANTY REGARDING ITS ADEQUACY, ACCURACY, COMPLETENESS, OR USEFULNESS, WITHOUT LIMITING THE GENERALITY OF THE FOREGOING, IT IS EXPRESSLY NOTED THAT THIS INFORMATION IS NOT PROVIDED UNDER A 10 CFR 50, APPENDIX B QUALITY ASSURANCE PROGRAM.

FIG. 5

Logo

| GE Home | Help | FAQs | Feedback |

GE Nuclear Parts Online

Customer Selection for Part Number 228B2614G003

Select the customer this request is for . . .   [ ARIZONA PUBLIC SERVICE ▼ ]

Then the Plant Location for the above customer   [ PALO VERDE ▼ ]

. . . then click  [ Next —> ]

FIG. 6

*Logo*

| GE Home | Help | FAQs | Feedback |

GE Nuclear Parts Online

Request for Quote 302-1

| | | | |
|---|---|---|---|
| RFQ# | | Customer | ARIZONA PUBLIC SERVICE |
| RFQ Quote | 07/28/2000 | Plant | PALO VERDE |
| Requester | | Authorized Buyer (To whom quote is to be sent) | John Smith |
| Fax Number | 000-000-0000 | Phone Number | 000-000-0000 |
| Mailing Address | ARIZONA PUBLIC SERVICE COMPANY<br>PALO VERDE NUCLEAR GENERATING STATION<br>P.O. BOX 5234<br>PHOENIX, ARIZONA 85072 | | |
| E-Mail Address | | | |

| | | | |
|---|---|---|---|
| Requested Part Number | 228B2614G003 | Quantity | 0 |
| Requested Part Description | | GE Part Description | ANALOG MODULE |
| Purchase Option | Electronic Service Program | Priority | For Stock |
| Quote Request Date | 08/04/2000 (mm/dd/yyyy) | Safety Class | SAFETY RELATED |
| Part Needed By | (mm/dd/yyyy) | Add... Special Requirements | Add... |

| Request Additional Parts | Send Quote... |

Parts Services

GE Home   Help   Feedback

Selected Part Information:

| | | | |
|---|---|---|---|
| Part Number: | 239B7507G001 | Shelf Life: 40 years | ASME: N |
| IEEE 323: | — IEEE 324: — | Safety Class: SAFETY RELATED | Lead Time: 21 weeks ** |
| Purchase Option: | New | | |
| GE Contact: | JOHN SMITH | Phone Number: (000) 000-0000 | Customer Serv: (800) 000-0000 |
| | GE Part Description: | ANALOG MODULE | |
| | Customer Part Description:<br>(Make changes where necessary) | ANALOG MODULE | |

** The Lead Time is an estimate. Actual Lead Time may be more or less depending on inventory. Customer unique contractual provisions are not reflected in this data.

| | | Customer RFQ: | (Optional-For Customer Use Only) |
|---|---|---|---|
| RFQ Number-Line: | 725-1 | | |
| Customer: | COMMONWEALTH EDISON | Plant: | DRESDEN 2 |
| Requester: | ALL | Quantity: | 2 |
| Authorized Buyer: | JOHN SMITH | Phone Number: | (000) 000-0000 |
| | Commonwealth Edison Company | | |

FIG. 9

| Customer Part Description: (Make changes where necessary) | ANALOG MODULE | | |
|---|---|---|---|
| ** The Lead Time is an estimate. Actual Lead Time may be more or less depending on inventory. Customer unique contractual provisions are not reflected in this data. | | | |
| RFQ Number Line: 725-1 | | Customer RFQ: ☐ | (Optional-For Customer Use Only) |
| Customer: COMMONWEALTH EDISON | | Plant: DRESDEN 2 | |
| Requester: ALL | | Quantity: 2 | |
| Authorized Buyer: JOHN SMITH | | Phone Number: (000) 000-0000 | |
| Mailing Address: Commonwealth Edison Company Dresden Gen. Station#12 6500 No. Dresden Road Morre, IL 80460 | | Fax Number: (000) 000-0000 | |
| | | RFQ Date: September 28, 2000 | |
| E-mail: | | Part Need Date: February ▼ 22 2001 | |
| Priority: -Choose One- ▼ | | Add MPLs | |
| Add Special Requirements | | | |
| | | Submit This RFQ | |
| Order More Parts | | | |

FIG. 10

Inside Services

Parts Services

GE Home   Help   Feedback

The part you selected has a replacement/supersession part available.
Please select the part that best fits your needs:

| | RFQ Number 725 and Line Number 1 | | | |
|---|---|---|---|---|
| Part Number: | 228B2614G003 (Original Selection) | Shelf Life: | 40 years | IEEE323: 1974 | IEEE324:1975 |
| Part Description: | ANALOG MODULE | | | |
| Part Number: | 239B7507G001 | Shelf Life: | 40 years | IEEE323: — | IEEE324: — |
| Part Description: | ANALOG MODULE | | | |
| | Submit Part Selected | | | |

FIG. 11

Inside Services

Parts Services

GE Home  Help  Feedback

Customer RFQ: 725
Customer: COMMONWEALTH EDISON    Plant Name: DRESDEN 2
Requester: ALL    Authorized Buyer: JOHN SMITH

| Item No. | Part Number | Part Description | Quantity | Date Req. |
|---|---|---|---|---|
| 1 | 239B7507 G001 | ANALOG MODULE | 2 | February 22, 2001 |
| | Add More Parts | | | Finish This RFQ ... |

INTERACTIVE SEARCH PROCESS FOR PRODUCT INQUIRIES

BACKGROUND OF THE INVENTION

This invention relates to a method and system for processing customer inquiries over a computer network and, more particularly, to a method and system for processing an inquiry from a customer for environment and use specific parts with advanced iterative searching to reflect multiple alternatives and anticipated product use.

While numerous processes exist that permit various commercial and information transactions via a computer network such as the Internet, existing processes typically focus to a great extent on commodity products (i.e., products that are easily described by only name or catalog number and that do not contemplate that the customer would impose additional requirements above and beyond standard product specifications). In addition, these systems are typically focused on the supply of products, without the supplier providing assistance to the customer to verify the correctness of the customer choice for the purposes the customer anticipates using the product. Certain applications are available via the Internet such as so-called "configurators" and "wizards," which enable a customer to select from lists of predetermined parameters or specify functions within a range. These systems, however, are developed ultimately to select combinations or arrangements of commodity products for sale to the customer.

It would thus be desirable to provide a method and system to effect complete commercial transactions via a computer network for products or services that must be uniquely adapted or verified for applicability on a customer application specific basis.

BRIEF SUMMARY OF THE INVENTION

In an exemplary embodiment of the invention, a method of processing an inquiry from a customer for environment and use specific parts includes (a) storing information relating to environment and use specific parts, including upgrades, supercessions, and replacements in a part database; (b) receiving a customer inquiry concerning a part; (c) searching the part database for the information relevant to the part; and (d) outputting the information for customer display. In this context, step (b) may be practiced by receiving a customer indication of anticipated part use, and step (c) may be practiced by searching the part database based on the anticipated part use. Anticipated part uses may include a designation of geographical location, an environment, whether the part is anticipated for use with safety concerns and the like. The storing step may be practiced by storing at least one of regulating organization, qualification status, shelf life, obsolescence information, delivery cycles and the like.

The method may further include enabling the customer to request a price quote for the part. In this context, the customer may select a purchase option, such as new, refurbished or upgraded, and the storing step may be practiced by storing individual contact information based on the selected purchase option. For business practice purposes, the price quote may have limited delivery only to an authorized representative. The price quote is preferably provided and varied based on the anticipated part use.

In another exemplary embodiment of the invention, a method of processing an inquiry from a customer includes (a) receiving a product inquiry from a customer, the inquiry including anticipated use information; (b) searching a database of products based on the product inquiry; and (c) outputting a search result.

BRIEF DESCRIPTION OF THE DRAWINGS

FIG. 4 is an exemplary screen shot for further customer inquiry input;

FIG. 5 is an exemplary screen shot showing a part description;

FIG. 6 is an exemplary screen shot for customer inquiry input;

FIG. 7 is an exemplary screen shot showing a Request for Quote form;

FIG. 8 is another exemplary screen shot of a customer customized Request for Quote form;

FIG. 9 shows a Request for Quote form with input areas for customer-specific information, priority, need dates, and the like;

FIG. 10 shows a sample online pricing dialog for an alternative part;

FIG. 11 shows a sample submittal summary form for a completed Request for Quote.

DETAILED DESCRIPTION OF THE INVENTION

Figure 1:
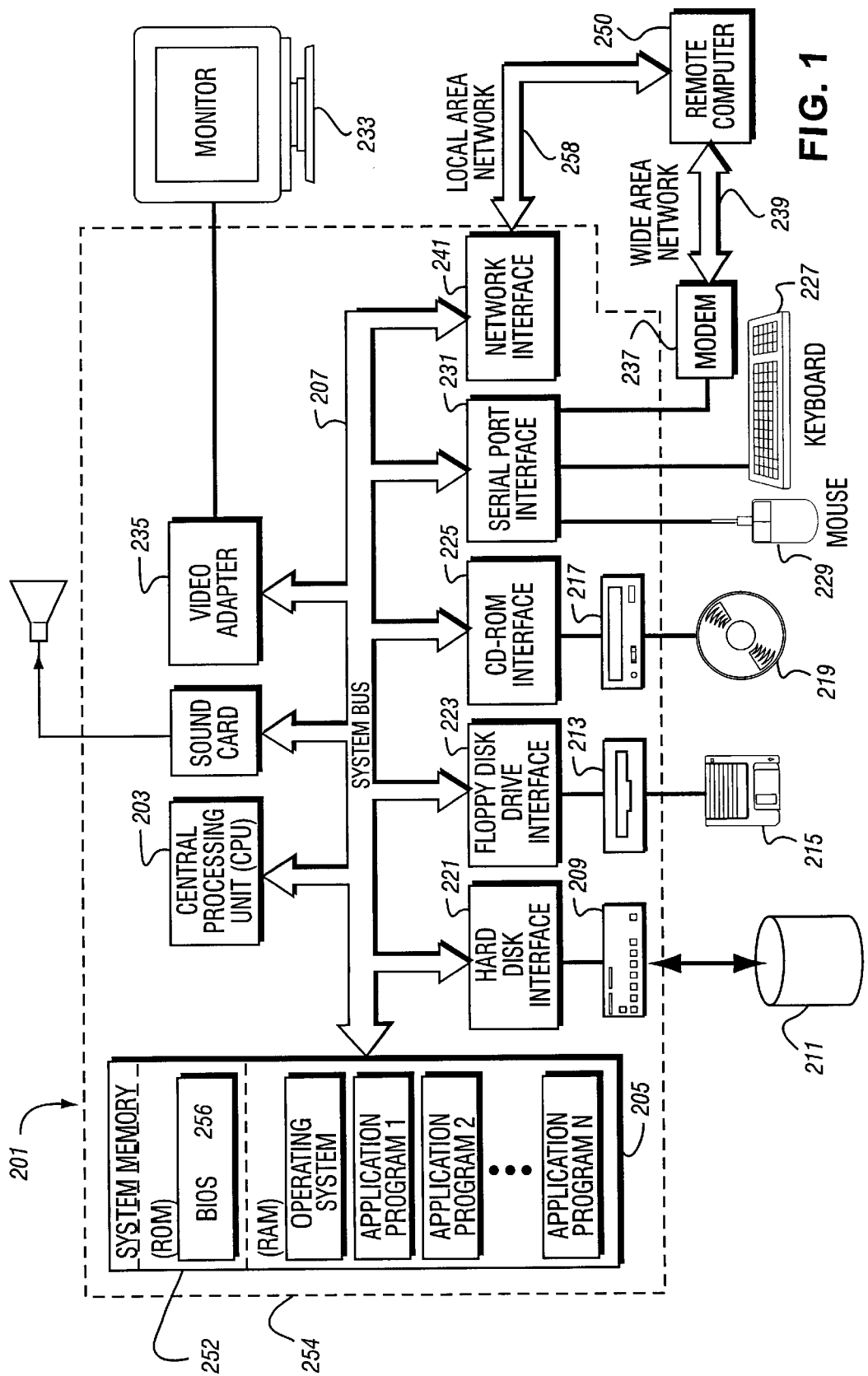
FIG. 1 is a schematic block diagram of a computer.

The product inquiry system implemented in the diagrams of FIGS. 2–7 is preferably a browser-based system in which a program running on a user's computer (the user's web browser) requests information from a server program running on a system server. The system server sends the requested data back to the browser program and the browser program then interprets and displays the data on the user's computer screen. The process is as follows:

1. The user runs a web browser program on his/her computer.

2. The user connects to the server computer (e.g., via the Internet). Connection to the server computer may be conditioned upon the correct entry of a password as is well known.

3. The user requests a page from the server computer. The user's browser sends a message to the server computer that includes the following:

the transfer protocol (e.g., http://); and the address, or Uniform Resource Locator (URL).

4. The server computer receives the user's request and retrieves the requested page, which is composed, for example, in HTML (Hypertext Markup Language).

5. The server then transmits the requested page to the user's computer.

6. The user's browser program receives the HTML text and displays its interpretation of the requested page.

Thus, the browser program on the user's computer sends requests and receives the data needed to display the HTML page on the user's computer screen. This includes the HTML file itself plus any graphic, sound and/or video files mentioned in it. Once the data is retrieved, the browser formats the data and displays the data on the user's computer screen. Helper applications, plug-ins, and enhancements such as Java™ enable the browser, among other things, to play sound and/or display video inserted in the HTML file. The fonts installed on the user's computer and the display preferences in the browser used by the user determine how the text is formatted.

If the user has requested an action that requires running a program (e.g., a search), the server loads and runs the program. This process usually creates a custom HTML page "on the fly" that contains the results of the program's action (e.g., the search results), and then sends those results back to the browser.

Browser programs suitable for use in connection with the product inquiry system of the present invention include Netscape ® Navigator available from Netscape ® Communications Corporation and Internet Explorer available from Microsoft ® Corp.

While the above description contemplates that each user has a computer running a web browser, it will be appreciated that more than one user could use a particular computer terminal or that a "kiosk" at a central location (e.g., a cafeteria, a break area, etc.) with access to the system server could be provided.

It will be recognized by those in the art that various tools are readily available to create web pages for accessing data stored on a server and that such tools may be used to develop and implement the product inquiry system described below and illustrated in the accompanying drawings.

FIG. 1 generally illustrates a computer system 201 suitable for use as the client and server components of the product inquiry system of the invention. It will be appreciated that the client and server computers will run appropriate software and that the client and server computers may be somewhat differently configured with respect to the processing power of their respective processors and with respect to the amount of memory used. Computer system 201 includes a processing unit 203 and a system memory 205. A system bus 207 couples various system components including system memory 205 to processing unit 203. System bus 207 may be any of several types of bus structures including a memory bus or memory controller, a peripheral bus, and a local bus using any of a variety of bus architectures. System memory 205 includes read only memory (ROM) 252 and random access memory (RAM) 254. A basic input/output system (BIOS) 256, containing the basic routines that help to transfer information between elements within computer system 201, such as during start-up, is stored in ROM 252. Computer system 201 further includes various drives and associated computer-readable media. A hard disk drive 209 reads from and writes to a (typically fixed) magnetic hard disk 211; a magnetic disk drive 213 reads from and writes to a removable "floppy" or other magnetic disk 215; and an optical disk drive 217 reads from and, in some configurations, writes to a removable optical disk 219 such as a CD ROM or other optical media. Hard disk drive 209, magnetic disk drive 213, and optical disk drive 217 are connected to system bus 207 by a hard disk drive interface 221, a magnetic disk drive interface 223, and an optical drive interface 225, respectively. The drives and their associated computer-readable media provide nonvolatile storage of computer-readable instructions, SQL-based procedures, data structures, program modules, and other data for computer system 201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on the hard disk 211, removable magnetic disk 215, optical disk 219 and/or ROM 252 and/or RAM 254 of the system memory 205. Such program modules may include an operating system providing graphics and sound APIs, one or more application programs, other program modules, and program data. A user may enter commands and information into computer system 201 through input devices such as a keyboard 227 and a pointing device 229. Other input devices may include a microphone, joystick, game controller, satellite dish, scanner, or the like. These and other input devices are often connected to the processing unit 203 through a serial port interface 231 that is coupled to the system bus 207, but may be connected by other interfaces, such as a parallel port interface or a universal serial bus (USB). A monitor 233 or other type of display device is also connected to system bus 207 via an interface, such as a video adapter 235.

The computer system 201 may also include a modem 237 or other means for establishing communications over the wide area network 239, such as the Internet. The modem 237, which may be internal or external, is connected to the system bus 207 via the serial port interface 231. A network interface 241 may also be provided for allowing the computer system 201 to communicate with a remote computing device 250 via a local area network 258 (or such communication may be via the wide area network 239 or other communications path such as dial-up or other communications means). The computer system 201 will typically include other peripheral output devices, such as printers and other standard peripheral devices.

As will be understood by those familiar with web-based forms and screens, users may make menu selections by pointing-and-clicking using a mouse, trackball or other pointing device, or by using the TAB and ENTER keys on a keyboard. For example, menu selections may be highlighted by positioning the cursor on the selections using a mouse or by using the TAB key. The mouse may be left-clicked to select the selection or the ENTER key may be pressed. Other selection mechanisms including voice-recognition systems, touch-sensitive screens, etc. may be used and the invention is not limited in this respect.

Figure 2:
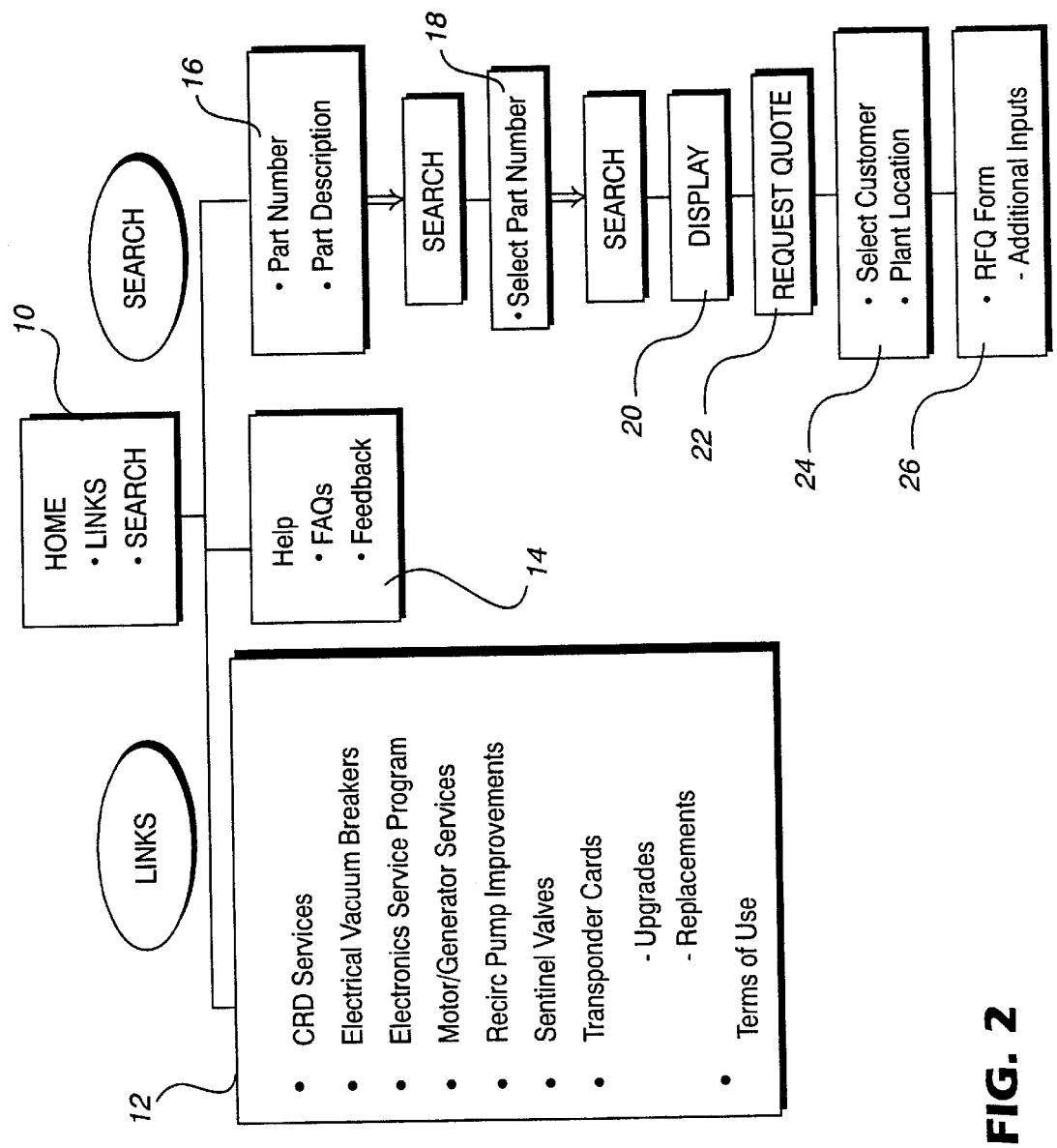
FIG. 2 is a block diagram showing the website architecture.
Figure 2A:
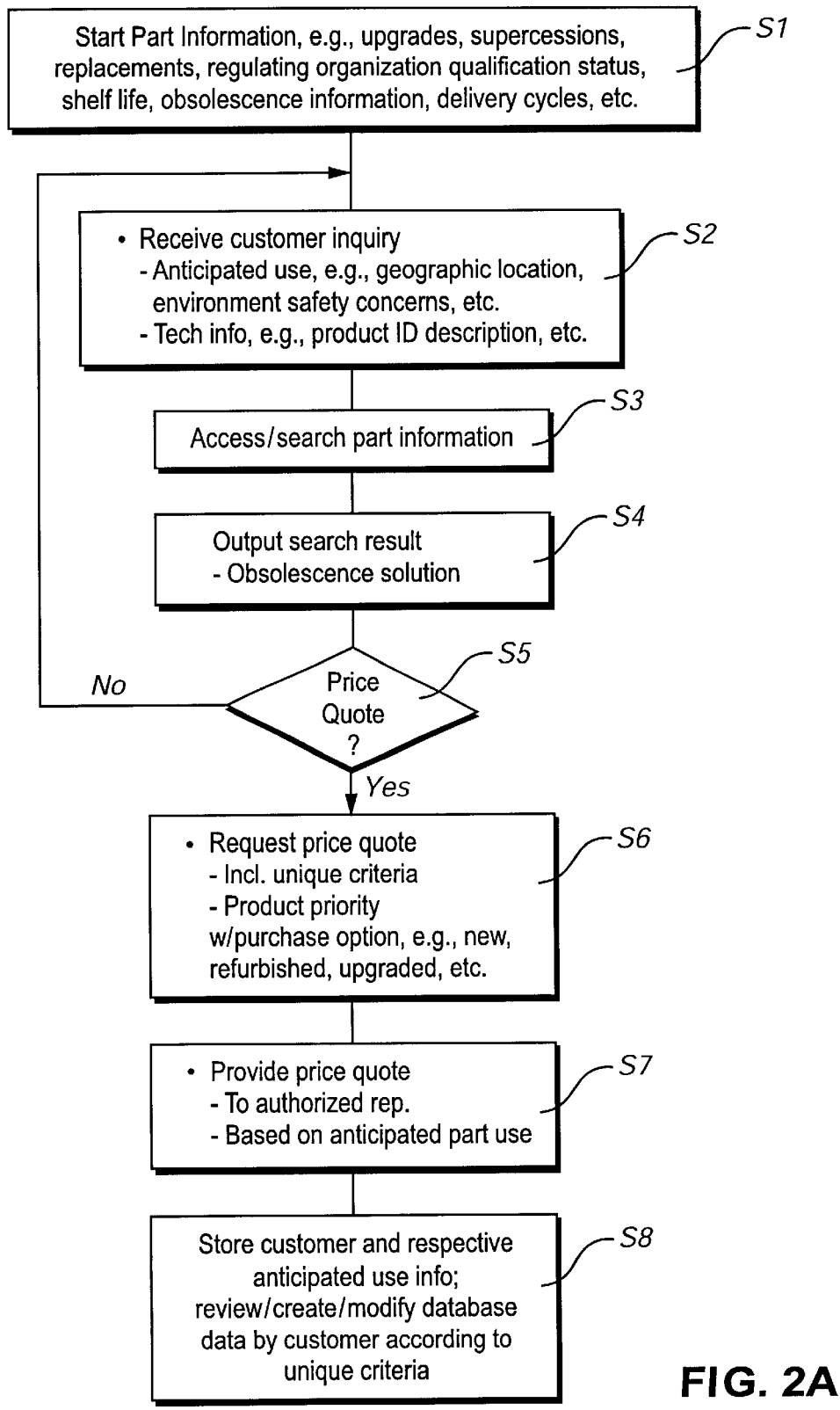
FIG. 2A is a flow chart showing the process carried out by the system of the invention.
Figure 3:
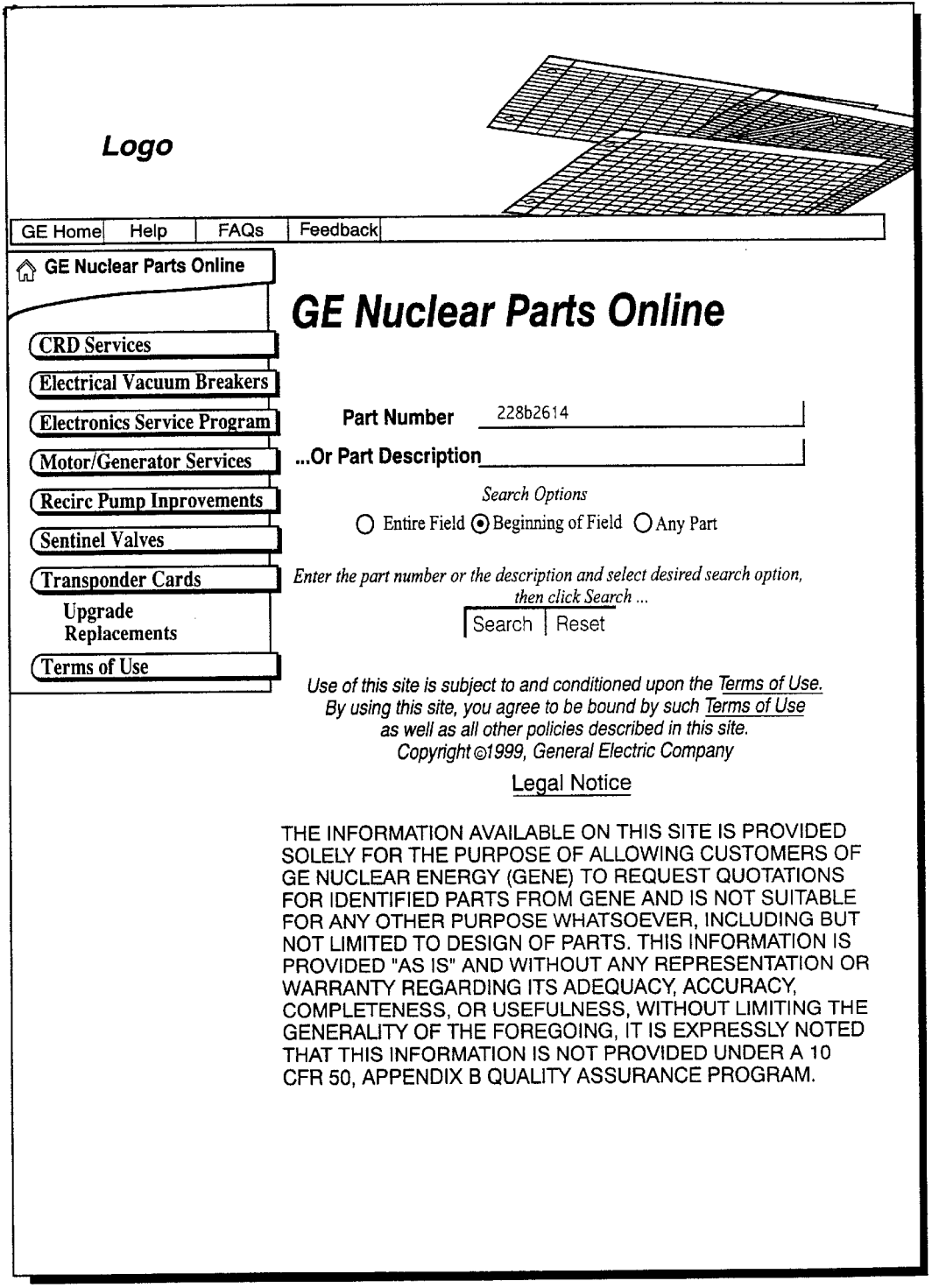
FIG. 3 is an exemplary screen shot for customer inquiry input.
Figure 12:
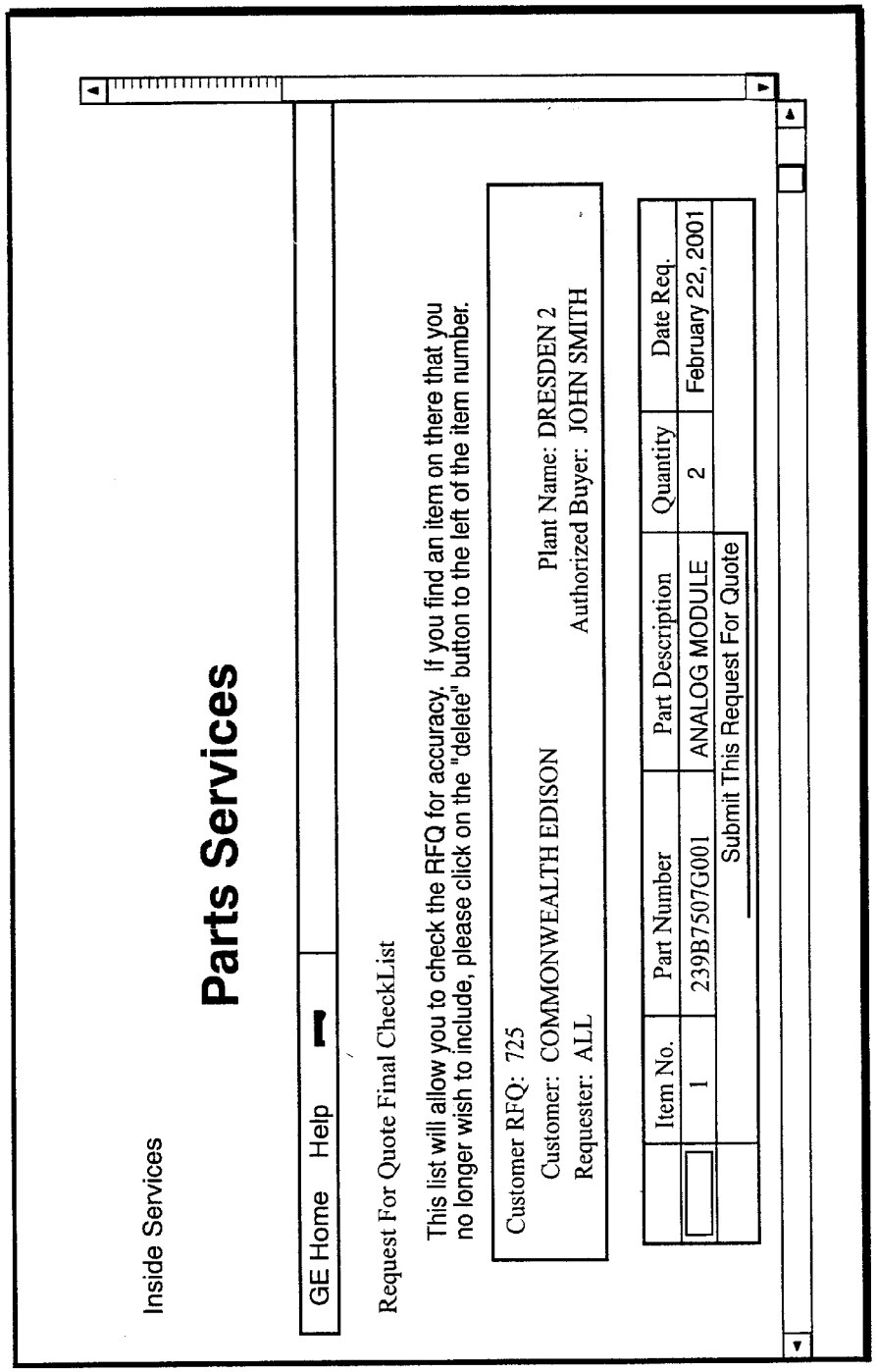
FIG. 12 is a sample form allowing the customer to confirm the desired list of products to be quoted.

FIG. 2 is a schematic block diagram of the website architecture, and FIG. 2A is a flow chart of the system process. A user/customer accesses a home page 10 via a computer network such as the Internet using a web browser program running on a computer. As discussed above, the customer requests the home page 10 from a server computer by sending a message to the server computer including the transfer protocol and the address or uniform resource locator (URL). At the home page 10, the user can access links 12, 14 to public information and website information, respectively generated from the source. As shown in FIG. 3, exemplary links for a nuclear parts website include CRD services, electrical vacuum breakers, electronics service program, motor/generator services, recirc pump improvements, sentinel valves, transponder cards (upgrades and replacements) and terms of use (see step S1, FIG. 2A). The customer can also access help information, frequently asked questions (FAQs) and provide feedback through the website. In this context, although the invention is described with its application to nuclear parts, this application is exemplary, and the invention is not meant to be necessarily limited to the described application.

With continued reference to FIGS. 2 and 3, the customer can alternatively perform a search by inputting a part number or part description (or portions thereof) 16 (see step S2). The server computer stores a database of products (see step S1), including parts and services, and runs appropriate software to search the database for products relating to the entered part number or part description (see step S3). The database and searching software are generally known and additional details thereof will not be further described. In the present invention, software is preferably configured to search for exact matches and closely related matches; however, the software can be configured to function in any known manner including using customer driven parameters.

As shown in FIG. 4, the customer can then select the part number/description 18 from the part number search results using known drop-down menus or the like. When the customer selects the desired part number, the server system searches the database to retrieve detailed information 20 relating to the selected part as shown in FIG. 5. With this information, the customer can refine their search and reach a preliminary tentative conclusion as to whether the specific product may fit their unique product needs. As shown, this information can include specialty manufacturing data such as regulating organization (such as IEEE and ASME) code qualification status, whether the part is anticipated for use with safety concerns, shelf life, purchase options such as new, refurbished or upgraded, and the like. The information may also include obsolescence solutions including a list of supercession or replacement parts and/or upgraded parts (see step S4). As shown in FIG. 5, a customer can search these parts via drop-down menus or the like. Information may still additionally include typical delivery cycles, part specific contact data (name and telephone number/e-mail address) and any other information as determined by the technical features of the product. These parameters can be further modified to reflect customer anticipated product use or the like. For example, with a change in purchase option using the drop-down menu as shown, the cycle time is correspondingly changed as well as other product information including contact information and the like.

From this display 20, the customer can request a quote for the selected product (part or service) by selecting a displayed link 22 as shown in FIG. 5 (see step S5–S6). As shown in FIG. 6, the customer identifies itself and the plant location for the selected product 24 using the drop-down menus. Alternatively, the customer may be automatically identified on the basis of the login ID and password used to initially access the system. Subsequently, the system displays a Request for Quote form 26 for the indicated customer and plant location. As shown in FIG. 7, the Request for Quote form includes information retrieved from a database of customer information including mailing address, fax number, and authorized buyer to whom the quote is to be sent, and the authorized buyer's phone number and the like. In this manner, the system enables engineering or other non-management personnel to request a quote including specific parameters encompassing anticipated use and the like, while the quote is forwarded only to the designated authorized representative. As such, the commercial aspects of any transaction with respect to the product can be limited to a customer-designated representative to whom the commercial data is to be submitted.

In the parts section as shown in FIG. 7, the customer can specify a unique description or added descriptive data beyond information displayed by the supplier, for example, to indicate an anticipated use of the product. With this information, the supplier can review the request and anticipated use and make an independent technical evaluation of product suitability. For example, in the context of a nuclear reactor, safety concerns are obviously of high importance. A part that is suitable for implementation into one nuclear plant is not necessarily suitable for another nuclear plant, even of the same plant type. Engineering requirements, particularly with respect to safety-related applications, take into consideration not only functional application of the part in the nuclear reactor, but also global characteristics of the plant itself including geographical location, environment and the like. In this context, for example, factors of safety for a particular part in a nuclear reactor may be higher in geographical locations having a history of earthquakes or high humidity or the like. Such considerations must all be considered to effectively determine suitability of a particular product, and the system of the present invention serves as a vehicle to achieve that aim.

Additionally, the Request for Quote form enables the customer to designate whether the product is anticipated for use with safety concerns, as some parts may be used in both safety related and non-safety related applications. A customer can also specify additional special requirements for the product that typically also encompass an indication of anticipated product use. With respect to priority, the customer can designate priority levels, which may affect the price included with the quote. For example, a customer may be requesting a product to replenish warehouse stock or alternatively for planned scheduled work, etc. As also shown in FIG. 7, the customer can specify the date by which a quotation and/or product delivery is required.

Preferably, the forms completion is made user-friendly enabling the customer to accumulate multiple line item requests under a single customer-specified request for quote identity and allow the customer to review the Request for Quote form after creation and before final submittal (particularly with multiple line item Request for Quote forms) and change the submittal by adding or deleting items before making the final Request for Quote submittal. Still additional information or specifications are entered into the supplier computer system with the Request for Quote form entries so that the customer information will be electronically available to the supplier personnel responding to a customer request. This customer and respective anticipated use information can be created, reviewed and modified in the supplier system by customer according to the unique criteria for the product.

With the supplied information, appropriate supplier personnel can uniquely interact with each customer and ensure that the electronically submitted request for quote (or purchase order) is adequately understood and complete to ensure proper processing. A customer service representative can examine the customer submitted Request for Quote form, discuss the transaction by telephone and/or other electronic means such as e-mail with the customer, and update, clarify or correct the item before releasing it into the supplier quote fulfillment system so that the quality and responsiveness of the supplier can be maximized. With this system, moreover, any commercial team member in the supplier organization can access submitted Request for Quote forms when contacted by a customer and release it into the supplier system in advance of the supplier customer service review in order to expedite processing of urgent customer requests.

With this system, pricing models may be constructed which take into consideration customer specific standards and terms of sale, product specific information, and specific information regarding the facility for which the product is intended. These pricing models may also be so constructed as to provide the supplier with the capability to define product- and customer-specific boundaries within which automated online pricing may be provided to the customer. As a consequence, automated routines may be established such that under supplier defined conditions, products are priced automatically online, while under other conditions, the very same product may be set aside for manual confirmation of the pricing by the supplier organization before release to the customer.

Still further, supplier personnel can perform detailed commercial and technical reviews by directly interacting with a database of customer-supplied information as well as other supplier databases and systems to thereby electronically review, create and modify data necessary to ensure that the product or service quoted and/or supplied to the customer is in compliance with the customer's unique technical and/or commercial requirements and is also appropriate for the customer's application, considering other industry, regulatory or supplier information, which may not even be known or available to the customer. The data may include both information suitable for release to the customer and intellectual property not suitable for release to a customer, in a database structure permitting data to be correspondingly classified and controlled. Information appropriate for release to the customer can be made available to the customer using the system of the present invention. Such information can include safety checklists to ensure that the product offered is in compliance with both customer and industry/regulatory requirements as well as requirements that may only be known to the supplier.

Obsolescence evaluations are also included to identify alternate products where the customer requested product is no longer available. Similarly, part equivalency evaluations are included to validate that alternate products located in an obsolescence evaluation are suitably interchangeable with the customer-requested product. This evaluation can identify any conditions of use that may need to be reviewed with the customer to ensure acceptability of the alternate product for the customer's use (i.e., mounting dimensions, product performance specification variations compared to the original product, etc.). Unique commercial reviews develop pricing consistent with unique aspects of the customer request. Pricing models sensitive to the customer and facility of use, as well as obsolescence information may then be constructed to display, under carefully controlled conditions, online pricing for customer consideration. In addition, customer-specific obsolescence information can be utilized to alert the customer to product alternatives at the time the customer uses the system to request a quote. Internet displays can enable a customer to obtain and/or review appropriate portions of the above information.

With the system of the present invention, a customer can search for products and retrieve information pertaining to the applicability of the product to its anticipated use. Additional anticipated use information can be supplied to the product supplier for further applicability analyses and a price quote.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of processing an inquiry from a customer for environment and use specific parts, the method comprising:

(a) storing information relating to environment specific parts and use specific parts in a part database, where part identifiers are without an inherent indication of specific environment or specific use, the information including any upgrades, supercessions, and replacements, and the information including parts suitable for implementation into nuclear plants, wherein parts suitable for implementation into one nuclear plant are not necessarily suitable for another nuclear plant, even of the same type;

(b) receiving a customer inquiry concerning a part including a customer indication of anticipated part use including at least atmospheric environment;

(c) searching the part database for the information relevant to the part by searching the part database based on the anticipated part use; and (d) outputting the information for customer display, wherein uncovered functionally suitable parts that do not satisfy the anticipated part use are omitted from the output information.

2. A method according to claim 1, wherein step (b) further comprises receiving the customer indication of whether the part is anticipated for use with safety concerns.

3. A method according to claim 1, further comprising (e) enabling the customer to request a price quote for the part.

4. A method according to claim 3, wherein step (e) further comprises enabling the customer to select a purchase option.

5. A method according to claim 4, wherein step (a) further comprises storing contact information based on the selected purchase option.

6. A method according to claim 3, wherein step (e) further comprises delivering the price quote only to an authorized representative.

7. A method according to claim 3, wherein the method further comprises providing the price quote based on the anticipated part use.

8. A method according to claim 1, wherein step (a) further comprises storing at least one of regulating organization information, qualification status, shelf life, obsolescence information and delivery cycles.

9. A method of processing an inquiry from a customer, the method comprising:

(a) receiving a product inquiry from a customer, the inquiry including anticipated use information comprising at least atmospheric environment;

(b) storing a database of products where product identifiers are without an inherent indication of specific environment or specific use, the database of products including parts suitable for implementation into nuclear plants, wherein parts suitable for implementation into one nuclear plant are not necessarily suitable for another nuclear plant, even of the same type;

(c) searching a the database of products based on the product inquiry; and (d) outputting a search result, wherein uncovered functionally suitable parts that do not satisfy the anticipated use information are omitted from the output search result.

10. A method according to claim 9, wherein step (a) comprises receiving a first inquiry including a product identifier or description, processing the first inquiry to output a class of matching products, and receiving at least a second inquiry including at least one of additional technical information and the anticipated use information.

11. A method according to claim 10, wherein the step of receiving at least a second inquiry comprises receiving at least a second inquiry including additional technical information comprising at least one of regulating organization information, qualification status, whether the part is anticipated for use with safety concerns, shelf life, obsolescence information, purchase options, delivery cycles, and contact person.

12. A method according to claim 11, wherein the purchase options comprise new, refurbished and upgraded.

13. A method according to claim 9, wherein step (d) further comprises outputting obsolescence solutions.

14. A method according to claim 9, further comprising (e) enabling the customer to request a price quote for the product.

15. A method according to claim 14, wherein step (e) further comprises enabling the customer to specify unique criteria for the product.

16. A method according to claim 15, further comprising storing customer and respective anticipated use information, and reviewing, creating and modifying the database data by customer according to the unique criteria for the product.

17. A method according to claim 14, wherein step (e) further comprises enabling the customer to specify product priority.

\* \* \* \* \*